Jan. 22, 1924.
S. W. OBERTO
AUTOMOBILE SIGNAL
Filed Jan. 31, 1923
1,481,480
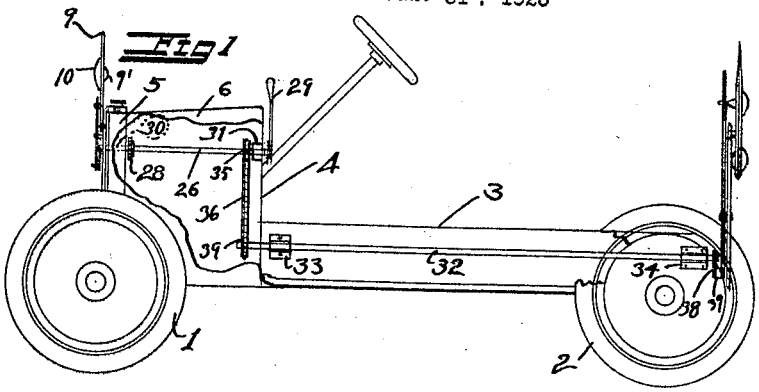
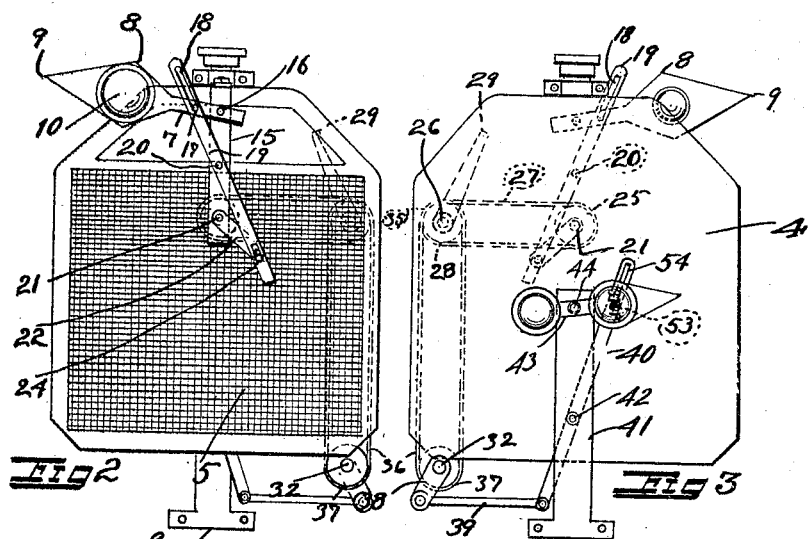
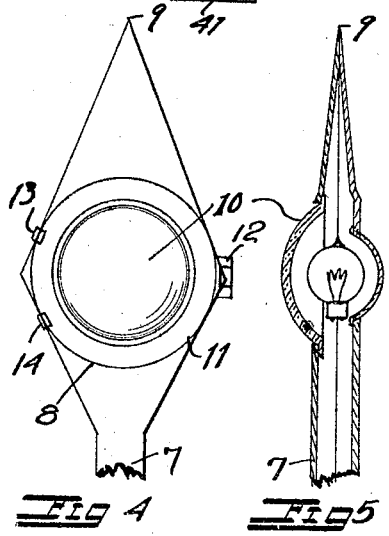
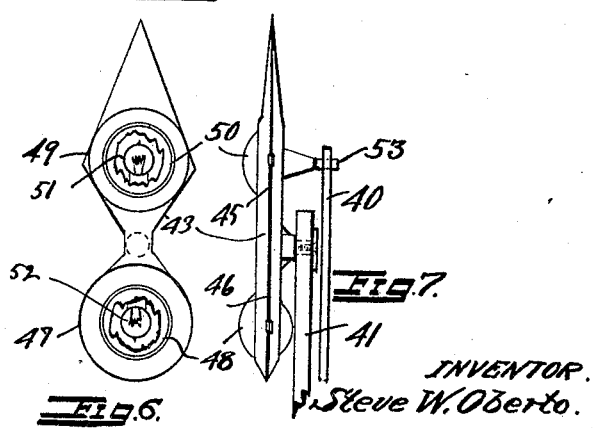
INVENTOR.
Steve W. Oberto.
Carlos P. Griffin
ATTORNEY Patented Jan. 22, 1924.

1,481,480

UNITED STATES PATENT OFFICE.

STEVE W. OBERTO, OF OAKLAND, CALIFORNIA.

AUTOMOBILE SIGNAL.

Application filed January 31, 1923. Serial No. 616,060.

*To all whom it may concern:*

Be it known that I, STEVE W. OBERTO, a citizen of the United States, residing at Oakland, in the county of Alameda, State of California, have invented a new and useful Automobile Signal, of which the following is a specification in such full and clear terms as will enable those skilled in the art to construct and use the same.

This invention relates to an automobile signal and its object is to provide means to signal persons in front of the car and at the rear of the car whether the driver is to turn in one direction or the other, and whether a stop is to be made or not.

This invention is an improvement on my automobile signal patent application filed October 29, 1921, Serial Number 511,312.

Another object is to provide a simple mechanism for operating signals within easy reach of the driver.

Another object is to provide means for illuminating the signals for night driving.

Other objects of the invention will appear as the description proceeds.

An embodiment of the invention is shown in the accompanying drawings, is which the same reference numeral is applied to the same portion throughout, but I am aware that there may be modifications thereof.

Fig. 1 is a side elevation of the running gear of an automobile showing the application of the signal thereto, Fig. 2 is a front elevation of the radiator showing how the signal is attached to the front part of the automobile, Fig. 3 is an elevation of the dash-board of an automobile showing the position of the signal in the rear of the automobile, Fig. 4 is a side elevation of the upper portion of the signal mechanism, Fig. 5 is a vertical sectional view of the signal mechanism shown in Fig. 4, Fig. 6 is a rear elevation of the signal used at the rear of the car, Fig. 7 is a side elevation of the rear signal.

The numerals 1 and 2 indicate the wheels of the vehicle, 3 the frame, 4 the dash-board, 5 the radiator and 6 the hood over the engine.

The front signal consists of an arm 7 having a circular head at 8 the upper end terminating in a sharp point at 9. The head 8 consists of a hollow body having a small bull's eye glass 9' at the rear, and a larger bull's eye glass 10 at the front.

The glass 10 is carried by a door 11, hinged at 12 having two friction maps 13 and 14 to hold it against the body 8.

The arm 7 is pivoted to a bracket 15 on the pivot 16. A pin 17 which may have a roller on it to reduce friction in a slot 18 of an arm 19 is pivoted at 20 on the bracket 15.

A shaft 21 is mounted in a tubular bushing pushed into the radiator 5 and journalled in the bracket 15. On the end of the shaft 21 is fixed a crank arm 22, which has the roller pin 23 adapted to slide in the slot 24 in the lower end of the arm 19 so that when shaft 21 is turned the crank will throw the upper end of arm 19 to right or left depending in which way the shaft 21 is turned. The slot 18, acting on the roller pin 17, throws the arm with the signal lamp to right or left of the bracket 15 or holds it vertical at will.

The means for turning the shaft 21 consists of a sprocket wheel 25 fixed to the shaft, and adapted to turn with a parallel shaft 26 by means of a chain 27 and sprocket 28, a handle 29 is fixed to the shaft 26. Suitable bearings are provided for shaft 26 at 30 and 31.

To operate the rear signal in unison with the front signal, motion is transmitted to a shaft 32 with bearings 33 and 34 attached to the frame of the automobile, a sprocket 35, a chain 36 and a sprocket 37, transmit motion from shaft 26 to shaft 32.

A crank-arm 38 has a connecting rod 39 which pivots on the end of a lever 40 which is pivoted on a bracket 41 at 42, the bracket 41 is attached to the automobile frame or to the fender, this may be made in any shape for convenient mounting.

At the top of the bracket is pivoted the rear signal 43 at 44. This signal consists of two arms 45, 46, one carrying a circular head 47 with a bull's eye 48 substantially like the head shown in Figs. 4 and 5.

The arm 45 carries a circular head 49 which has a bull's eye 50 substantially like the bull's eye 10 in Figs. 4 and 5.

A pin 53 projecting from the head 45 is adapted to slide in the slot 54 in arm 40 whereby the signal is thrown to the right or left as desired and to correspond with the front signal.

Lamps 51 and 52 serve to illuminate the opposite ends of the signal.

Suitable wires connecting the lamps, front and rear, to a source of electricity may be applied in any well known way, and suitable switches may be provided for turning on or off different lamps at will.

In the rear signal arm the upper lamp can be used for a safety stop and may be used automatically or by the driver pressing a switch button.

The lower lamp may be on continuously at night and switched off in the daytime.

What I claim is as follows, but modifications may be made in carrying out the invention shown in the drawings and in the above particularly described form thereof, within the purview of the invention.

An automobile signal comprising a pair of pivoted signal arms, one at the front and the other at the rear of an automobile, brackets to support said arms, a lever pivoted on each bracket each of said levers having slots in its upper ends, pins on said signal arms which extend through the slots of each lever said levers also having slots in their lower ends, cranks engaging the slots in the lower ends of said levers, a shaft carrying each crank, and means for operating said shafts in unison whereby the front and rear signals may be simultaneously operated.

In testimony whereof I have hereunto set my hand this 24th day of January, A. D. 1923.

STEVE W. OBERTO.